United States Patent [19]

Schlotterbeck et al.

[11] Patent Number: 4,462,203

[45] Date of Patent: Jul. 31, 1984

[54] SPROCKET-SHAPED MEMBER FOR SUPPORTING APRON TUBES IN ROLL BALING MACHINE

[75] Inventors: Stephen C. Schlotterbeck, New Holland; Francis L. Uhland, Jr., Narvon; Willis R. Campbell, Ephrata; John H. Freimuth, New Holland, all of Pa.

[73] Assignee: Sperry Corporation, New Holland, Pa.

[21] Appl. No.: 414,753

[22] Filed: Sep. 3, 1982

[51] Int. Cl.³ .............................................. A01D 39/00
[52] U.S. Cl. .................................... 56/341; 100/153; 100/162 B; 100/88
[58] Field of Search ............ 56/341, 16.5; 100/88, 100/162 B, 153, 118; 198/779, 844

[56] References Cited

U.S. PATENT DOCUMENTS

| 965,486 | 7/1910 | Putt | 100/153 |
|---|---|---|---|
| 976,113 | 11/1910 | Zehner | 100/153 |
| 2,906,395 | 9/1959 | Greer | 198/844 |
| 4,022,120 | 6/1977 | McAllister | 100/88 |
| 4,057,105 | 11/1977 | Bailey | 165/119 |
| 4,212,149 | 7/1980 | Krone et al. | 100/88 |
| 4,343,141 | 8/1982 | Oellig et al. | 56/341 |

Primary Examiner—Gene Mancene
Assistant Examiner—John G. Weiss
Attorney, Agent, or Firm—Darrell F. Marquette; Frank A. Seemar; Larry W. Miller

[57] ABSTRACT

In a roll baling machine having a floor roller and an apron which cooperate in suitable manner to form roll bales, a sprocket-shaped member is provided to support the transverse tubes of the apron against bending and twisting loads during bale formation and thereby prevent damage to the apron.

5 Claims, 5 Drawing Figures

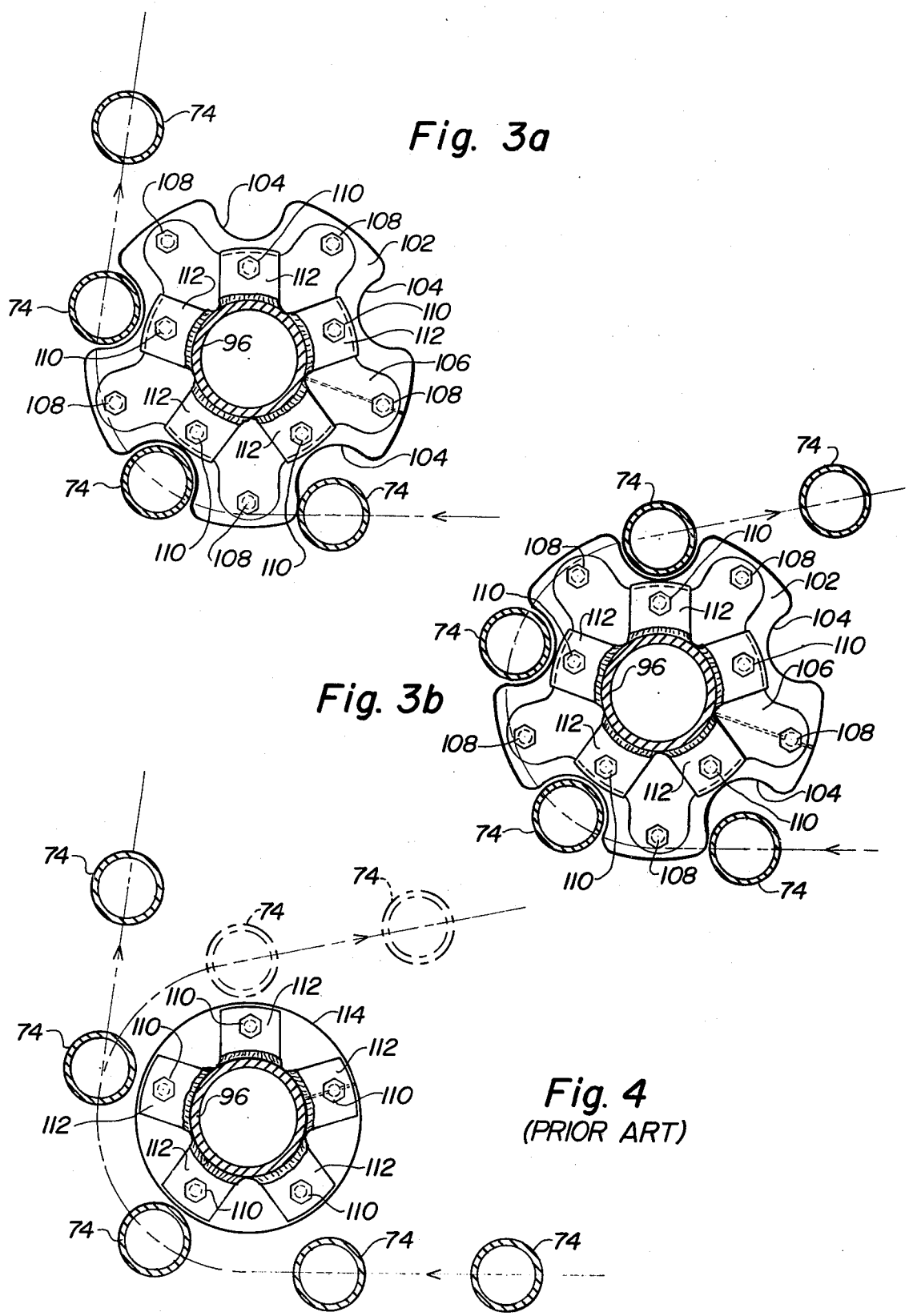

SPROCKET-SHAPED MEMBER FOR SUPPORTING APRON TUBES IN ROLL BALING MACHINE

BACKGROUND AND SUMMARY OF THE INVENTION

This invention relates generally to roll baling machines typically referred to as "round balers" which form cylindrical roll bales of crop material.

In a type of roll baling machine having a floor roller and a bale forming apron which consists of endless chains and transverse tubes, there is a tendency for the apron chains and tubes to become damaged during bale formation because of the heavy bending and twisting loads exerted on the apron tubes in the area where the apron is very close to the floor roller. Such damage may be in the form of permanently bent apron tubes and broken apron chains. One attempt to overcome this problem has been to merely strengthen the apron tubes. This has proven unsuccessful, however, since the tubes still become permanently deformed.

The present invention overcomes the above-mentioned problem by providing a rotatable sprocket-shaped member for supporting the apron tubes intermediate the chains in the area where the apron is closest to the floor roller. The sprocket-shaped member has notches for receiving and supporting the tubes. In its preferred embodiment, the sprocket-shaped member is formed of a rubber material.

DESCRIPTION OF THE DRAWINGS

FIGS. 3a and 3b are sectional views taken along lines 3—3 of FIG. 2 showing the sprocket-shaped member of the present invention; and FIG. 4 is a sectional view similar to FIGS. 3a and 3b showing a prior art idler.

DESCRIPTION OF THE PREFERRED EMBODIMENT

Figure 1:
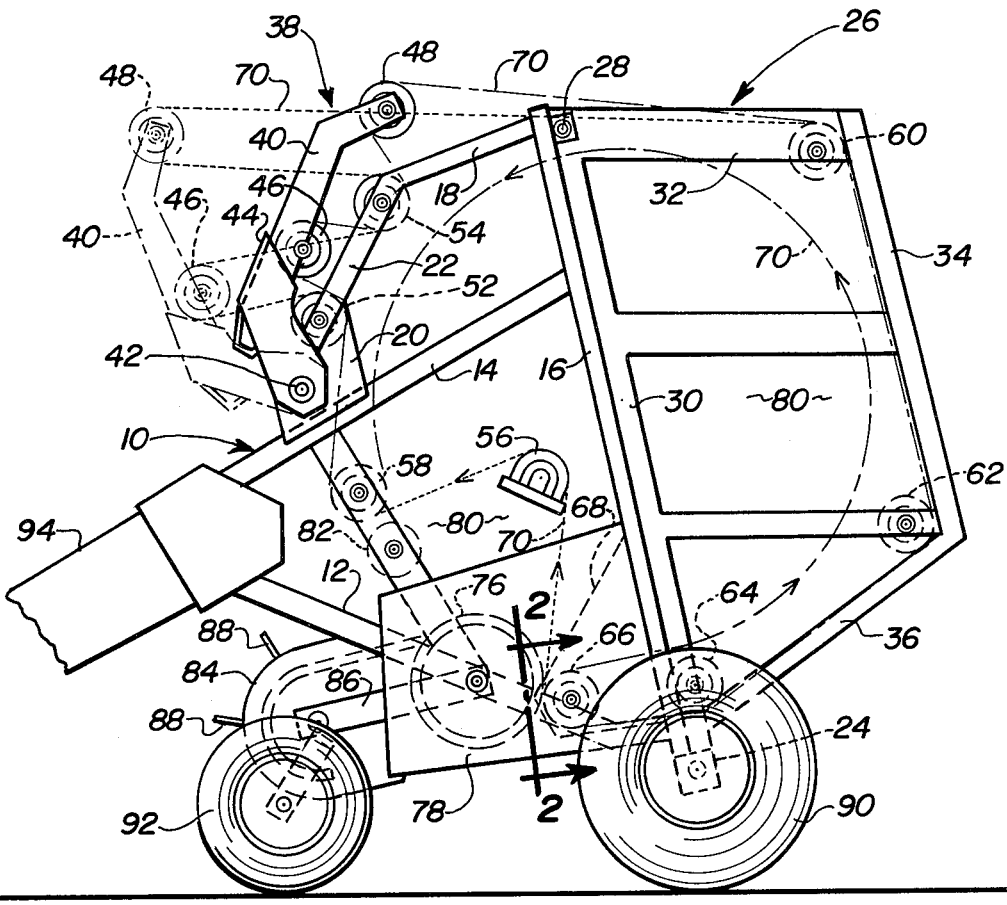
FIG. 1 is a side elevation view of a typical roll baling machine embodying the present invention.

Referring to FIG. 1, a typical roll baling machine embodying the preferred embodiment of the present invention includes a base frame 10 having opposite sides each formed generally of frame members 12,14,16 rigidly connected in a triangular configuration with side plates substantially covering the space therebetween. Each side of the base frame 10 includes an upper section, which consists of a frame member 18 rigidly connected to the frame member 16, a bracket 20 rigidly connected to frame member 14, and a frame member 22 rigidly connected between the frame member 18 and the bracket 20. A plate is connected to and covers the space between the frame members 14,16,18 and 22. A frame member 24 extends transversely of the machine and is rigidly connected to the frame members 16. A rear frame 26 is pivotally connected at 28 to the base frame 10 by suitable bearings. The rear frame 26 has opposite sides each formed generally of frame members 30,32,34,36 rigidly connected in a substantially trapezoidal configuration with side plates substantially covering the space therebetween. Other frame members (not shown) extend transversely of the machine and connect the opposite sides of the base frame 10 and the opposite sides of the rear frame 26. In FIG. 1, the forward end of the machine is to the left and the rearward end thereof is to the right.

The rear frame 26 is pivotally movable from the lower position shown in FIG. 1 to an upper position (not shown) by conventional means such as hydraulic cylinders (not shown) mounted at the sides of the machine and connected between the base frame 10 and the rear frame 26.

An arm assembly 38 is rotatably mounted on the base frame 10 for rotational movement between a forward position shown in phantom lines and a rearward position shown in full lines in FIG. 1. The arm assembly 38 includes arms 40 disposed inboard the sides of the machine. The arms 40 are rigidly connected to a cross tube 42 by bracket members 44. The cross tube 42 is rotatably mounted in suitable bearing members carried by the brackets 20 on the opposite sides of the base frame 10. The arm assembly 38 is normally urged toward its forward position preferably by conventional means such as extension or compression springs (not shown) connected between the arm assembly 38 and the base frame 10.

The arm assembly 38 carries rotatable guide members 46 and 48 on its arms 40. The base frame 10 supports rotatable guide members 52,54 and cam guide members 56 inboard its opposite sides. Preferably, the cam guide members 56 are of the known type disclosed in U.S. Pat. No. 3,901,007 and designated therein by the numeral "118". Sprockets 58 are provided inboard the opposite sides of the base frame 10 and are fixed on a shaft that is rotatably mounted in suitable bearings on the base frame 10. The rear frame 26 supports rotatable guide members 60,62,64 and 66 inboard its opposite sides. The guide members 66 are carried on brackets 68 projecting from the frame members 30 of the rear frame 26.

Figure 2:
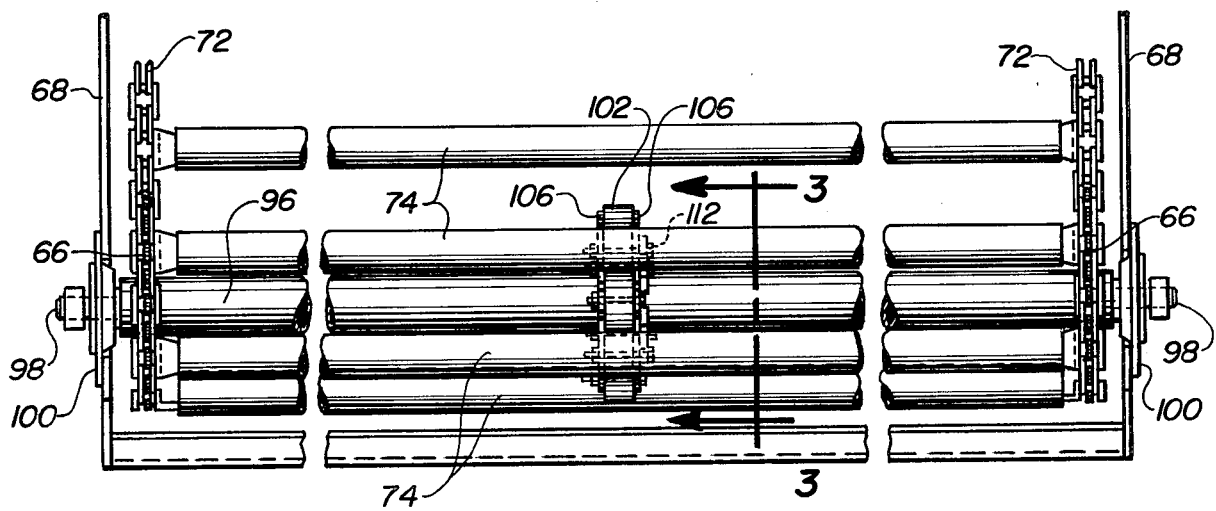
FIG. 2 is an enlarged sectional view taken along lines 2—2 of FIG. 1.

A flexible bale forming apron 70 is movably supported on the aforementioned guide members and sprockets. As shown in FIG. 2, the apron 70 is preferably formed of a pair of endless link-type chains 72 connected at spaced intervals by transverse tubes or slats 74. The apron chains 72 extend around and engage the various guide members and the sprockets 58. This apron 70 is of the known type disclosed in U.S. Pat. No. 3,901,007 and designated therein by the numeral "82".

A floor roller 76 extends transversely of the machine and is rotatably supported by brackets 78 on the opposite sides of the base frame 10. When the machine is empty, the upper surface of the floor roller 76 cooperates with a course of the apron 70 that extends upwardly and rearwardly from the guide members 66 over the cam guide members 56 and then downwardly and forwardly to the sprockets 58 to define an expandable bale chamber 80 having an initial wedge shape in side elevation. In this initial wedge shape, the forward end of the bale chamber is narrower than the rearward end thereof. A stripper roller 82, preferably rubber coated, extends transversely of the machine and is rotatably supported on the opposite sides of the base frame 10. The stripper roller 82 is positioned at the forward end of the bale chamber 80 in close proximity to the apron 70.

A pickup header 84 extends transversely of the machine and is supported by brackets 86 on the opposite sides of the base frame 10. The pickup header 84 is preferably of conventional type having a series of projecting fingers 88 for engaging and picking up windrowed crop material. A pair of wheels 90 mounted on the opposite sides of the base frame 10 support the machine. The wheels 90 are mounted on spindles which are connected to the frame member 24. Another pair of wheels 92 are mounted to the brackets 86 to provide support primarily for the pickup header 84. A tongue 94 is provided on the forward end of the base frame 10 for connection to a tractor.

The machine includes drive means (not shown) adapted for connection to the power take off unit (PTO) of a tractor. Referring to FIG. 1, rotary driving power will be delivered from the tractor PTO in a known manner to cause rotation of the sprockets 58, the floor roller 76, the stripper roller 82, and the pickup header fingers 88 in the same direction. Rotation of the sprockets 58 will drive the apron chains 72 thereby propelling the apron 70 around the various guide members in the base frame 10 and the rear frame 26 in the direction and along the path indicated. Preferably, the peripheral speed of the floor roller 76 should be equal to or slightly higher than the speed of the apron 70. This will tend to keep a roll of crop material toward the rearward end of the machine during formation.

As the machine is pulled across a field by a tractor, the pickup header fingers 88 engage, pickup and deliver windrowed crop material onto the upper surface of the rotating floor roller 76 in the bale chamber 80. The crop material is carried upwardly and then coiled back downwardly onto itself by the apron 70 which in its starting position moves upwardly and rearwardly from the guide members 66 over the cam guide members 56 and then downwardly and forwardly to the sprockets 58. This movement of the apron 70 in the bale chamber effectively starts the core of the roll bale. The rotating stripper roller 82 removes crop material from the apron 70 at the forward end of the bale chamber 80 and delivers it back downwardly into the bale chamber 80. The roll bale increases in diameter lifting the inner course of the apron 70 that extends between the guide members 66 and the sprockets 58 off the cam guide members 56, and expanding the bale chamber 80 from its initial wedge shape to a substantially circular shape. The expansion of the bale chamber 80 results in expansion of the inner course of the apron 70 contacting the peripheral surface of the roll bale and movement of the apron 70 toward its final position shown in FIG. 1. This movement of the apron 70 is accomplished by rotation of the arm assembly 38 in a clockwise direction as viewed in FIG. 1, from its forward position. When the bale reaches its maximum diameter, the apron 70 will be in its final position of FIG. 1 and the arm assembly 38 will have rotated at its rearward position shown in FIG. 1. When it is desired to discharge a bale from the machine, the rear frame 26 is raised to its upper position. This stretches the inner course of the apron 70 across the space between the guide members 66 and the sprockets 58 thereby assisting the bale to exit the machine. The bale rotates in a clockwise direction as viewed in FIG. 1 as it exits the base frame 10.

Referring now to FIG. 2, it will be seen that the guide members 66 are mounted on a tube assembly 96 which extends transversely of the machine with the ends 98 thereof rotatably disposed in bearing members 100 carried in the brackets 68. A sprocket-shaped member 102, preferably formed of rubber, is mounted on the tube assembly 96 approximately midway between the brackets 68. As shown in FIGS. 3a and 3b, the sprocket-shaped member 102 has notches 104 for receiving the apron tubes 74. The sprocket-shaped member 102 is secured between a pair of plates 106 by bolts 108. The sprocket-shaped member 102 and the plates 106 are then fastened by bolts 110 to tabs 112 which are welded to the tube assembly 96.

During bale formation, the apron 70 is most heavily loaded in the area where it is closest to the floor roller 76. This is the area where the apron tubes 74 come into contact with the bale as the apron 70 moves in the direction and along the path indicated in FIG. 1. In this area, the apron tubes 74 are subjected to the greatest bending and twisting loads which are transferred to the apron chains 72. Without the present invention, these loads can result in damage to the apron 70 in the form of permanently bent apron tubes and broken apron chains. The sprocket-shaped member 102 of the present invention supports the apron tubes 74 adequately enough in the area where the apron 70 is under the heaviest loads to prevent bending or twisting damage to the apron tubes 74 and the apron chains 72. FIG. 3a shows the relationship between the sprocket 102 and the apron tubes 74 when bale formation starts, and FIG. 3b shows the relationship between the sprocket 102 and the apron tubes 74 when a full bale has been formed. There is a clearance between the apron tubes 74 and the notches 104 of the sprocket-shaped member 102, as seen in FIGS. 3a and 3b, which is sufficient to permit some flexing of the apron tubes 74 but which is not sufficient to permit any permanent deformation of the apron tubes 74.

A smooth idler 114 shown in FIG. 4 has been used prior to the sprocket 102 of the present invention. The smooth idler 114 will not prevent bending or twisting damage to the apron, however, since it does not adequately support the apron tubes 74.

The present invention is not limited to use on roll baling machines that have expandable bale chambers and, accordingly, may be used on roll baling machines having fixed bale chamber.

The following claims are intended to cover all modification and variations of the preferred embodiment of the present invention without departing from the spirit and scope of the invention.

Having thus described the invention, what is claimed is:

1. In a roll baling machine having a frame, an apron movably supported on said frame to form a roll bale of crop material, said apron moving in a predetermined direction and along a predetermined path during formation of said roll bale said apron including endless flexible members and transverse members extending between and interconnecting said endless flexible members, the improvement comprising:
   a sprocket-shaped member rotatably carried on said frame for supporting said transverse members intermediate said endless flexible members in an area where said transverse members are coming into contact with said roll bale when said apron is moving in said predetermined direction and along said predetermined path; and
   said sprocket-shaped member having notches for receiving said transverse members.

2. The improvement of claim 1, wherein said sprocket-shaped member is formed of a rubber material.

3. The improvement of claim 1, wherein said sprocket-shaped member is fastened to a tube assembly extending transversely of the machine.

4. The improvement of claim 1, wherein said notches receive said transverse members with a clearance therebetween which is sufficient to permit some flexing of said transverse members but no permanent deformation of said transverse members.

5. A roll baling machine comprising:
   (a) a frame;
   (b) a floor roller and an apron each movably supported on said frame and cooperating with each other to form a roll bale of crop material said apron moving in a predetermined direction and along a predetermined path during formation of said roll bale;
   (c) said apron including endless flexible members and transverse members extending between and interconnecting said endless flexible members;
   (d) a sprocket-shaped member rotatably carried on said frame for supporting said transverse members in an area adjacent said floor roller where said transverse members are coming into contact with said roll bale when said apron is moving in said predetermined direction and along said predetermined path; and
   (e) said sprocket-shaped member having notches for receiving said transverse members.

* * * * *